United States Patent Office 3,138,010
Patented June 23, 1964

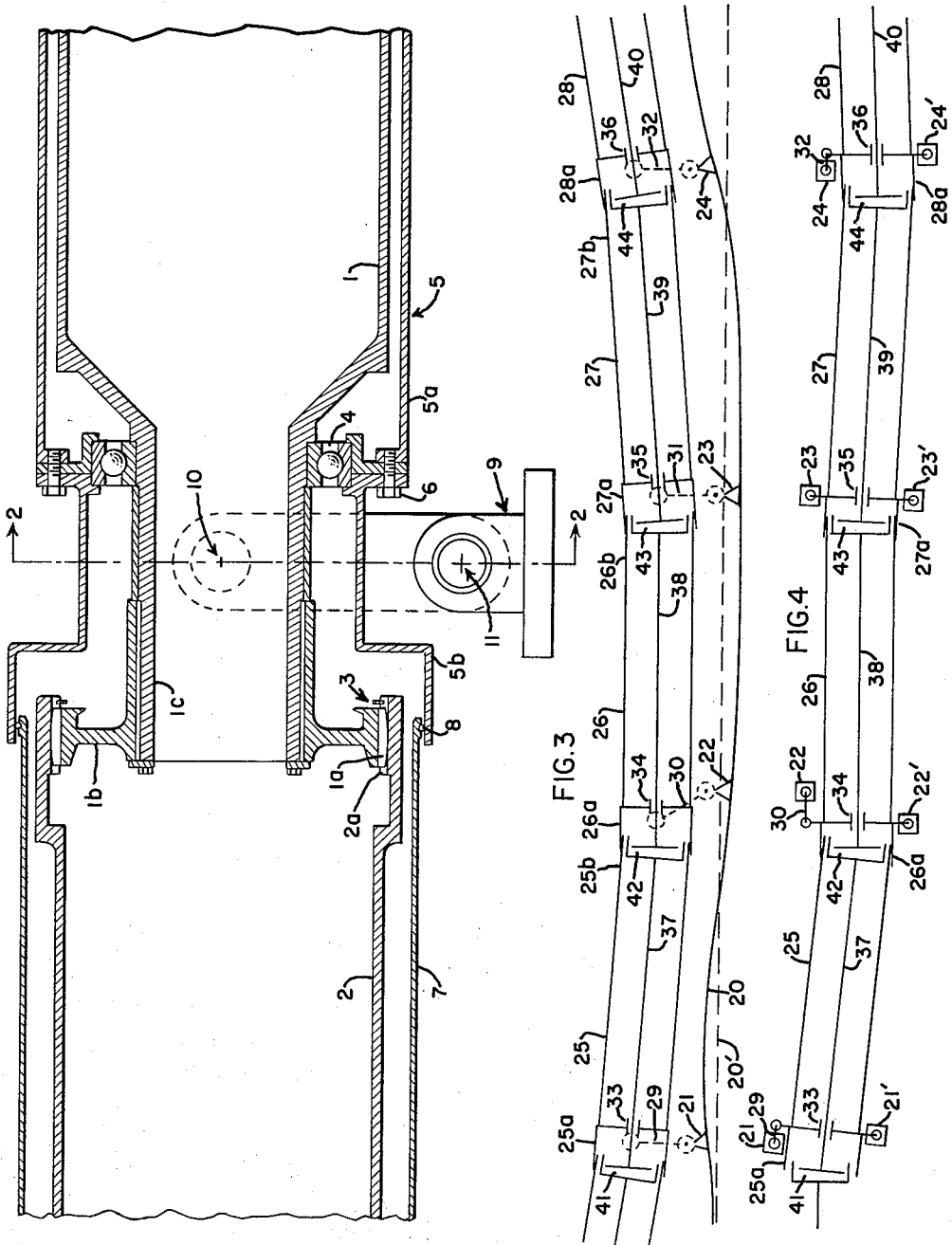

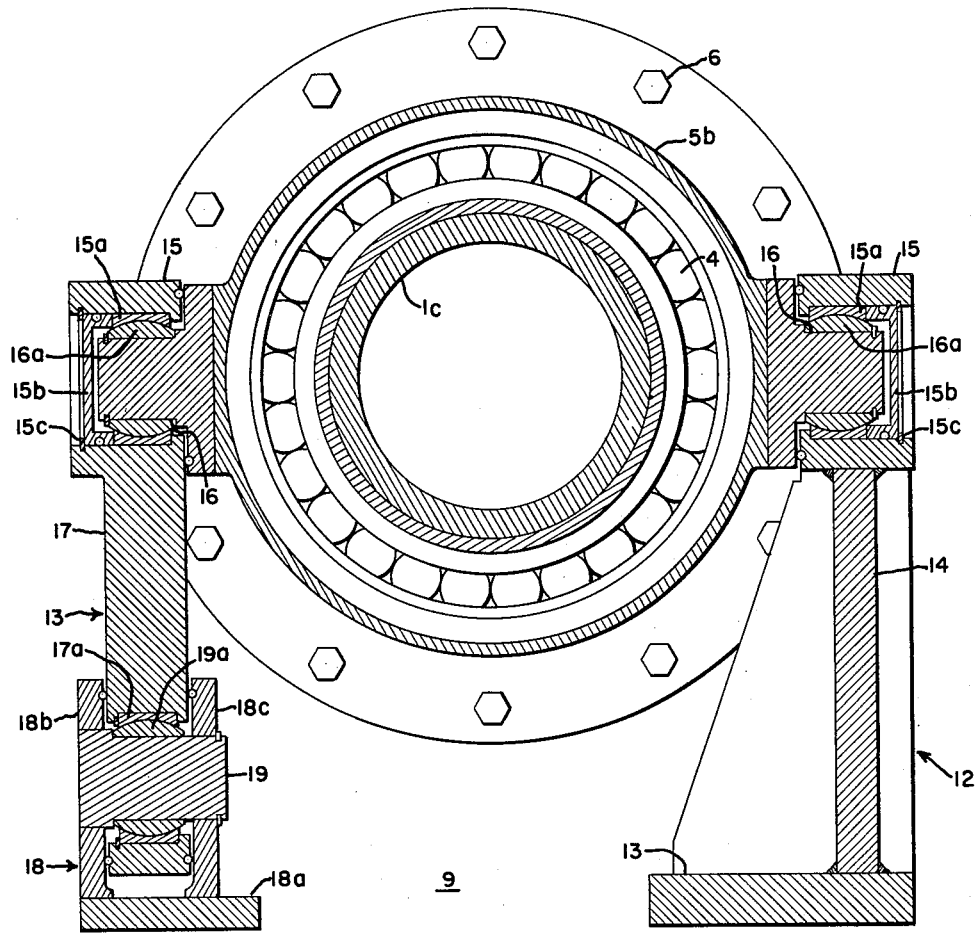

3,138,010
FLEXIBLE SHAFTING
Eugene E. Shipley, Middleton, and Henry Sorensen, Marblehead, Mass., assignors to General Electric Company, a corporation of New York
Filed Mar. 22, 1963, Ser. No. 267,216
4 Claims. (Cl. 64—1)

This invention relates to an improved arrangement for flexible torque-transmitting shafting, and more particularly to an improved arrangement using short interconnected shaft sections with flexible couplings and including means to reduce misalignment between the couplings.

Whenever it is necessary that torque be transmitted over a relatively long distance, there is the possibility that the structure supporting the shaft may deflect or expand and contract thermally, putting added stress on the shaft through the bearings. For example in the propulsion shaft of a boat, where power is transmitted some distance over the shaft, the vessel may undergo deflections tending to misalign the bearing pedestals. Such deflections occur due to torsional twisting of the hull or sagging or bowing of the deck. These may take place simultaneously and are extremely indeterminate.

To this end, it has been suggested to subdivide the shaft into short sections which are connected by flexible couplings, such as spline tooth connections which allow slight misalignment between the short sections. One method for doing this has been to mount each individual shaft section separately in a pair of spaced rigid pedestal assemblies, and to connect the ends of the shaft sections by a torque tube with splined connections. This arrangement requires two bearings per shaft section and it will be apparent that, since each pair of bearing pedestal assemblies is separate from the next pair, different degrees of spline tooth misalignment will take place along the length of the shafting. Since the structure supporting the bearing pedestal assemblies may deflect in a manner which is by no means uniform, it would be desirable nevertheless to reduce the effect of misalignment of the pedestals on the flexible shaft couplings.

Accordingly, one object of the present invention is to provide an improved flexible shafting arrangement for torque transmission over a relatively great distance.

Another object of the invention is to provide an improved flexible shafting arrangement employing interconnected short shaft sections wherein local misalignments between support pedestals are distributed among the coupled shaft sections.

Still another object of the invention is to provide an economical arrangement for long sections of torque transmission shafting using a relatively few number of bearing pedestal assemblies and splined connections.

Still another object of the invention is to provide a simplified arrangement for reducing the local misalignment between a number of short shaft sections connected by flexible couplings.

Further objects and advantages of the invention will become apparent from the description that follows, taken in connection with the accompanying drawing in which:

FIG. 1 is an elevation drawing, in section, of the coupling and bearing pedestal arrangement at the intersection of two shaft sections, according to the preferred embodiment of the invention.

FIG. 2 is an enlarged sectional view, looking in an axial direction along lines 2—2 of FIG. 1, showing the construction of the bearing pedestal assembly.

FIG. 3 is a single line diagrammatic drawing, in elevation, showing several interconnected sections of shafting in an exaggerated condition of misalignment, and FIG. 4 is a plan view similar to FIG. 3.

Briefly stated, the invention is practiced by providing only one bearing for each shaft section and orienting each bearing by means of a structural guiding member, which is supported on only one end by a pedestal assembly. The other end of each guiding member is supported by an adjacent guiding member, so as to cause each guiding member to influence the position of the adjacent guiding member. The pedestal assemblies provide an additional degree of freedom to permit this adjustment. The shaft sections are connected by flexible couplings, which also support the free end of each shaft section.

Referring now to FIG. 1 of the drawing, a hollow shaft section 1 is connected to transmit torque to a hollow shaft section 2 by means of a flexible coupling shown generally as 3. Flexible coupling 3 may be one of many suitable types, but as shown here includes a set of internal spline teeth 2a inside hollow shaft 2 which mesh with external spline teeth 1a. Spline teeth 1a are cut on a radially flanged member 1b which, in turn, is attached to a reduced diameter portion 1c of shaft 1.

The right-hand end of shaft 1 (not shown) would be substantially identical to the illustrated portion of shaft 2 in FIG. 1. Converesly, the left-hand end of shaft 2 (not shown) would be substantially identical to the illustrated portion of shaft 1 (see FIGS. 3 and 4).

Shaft 1 is rotatably journaled in a set of bearings 4 which are supported in fixed relation to an outer cylindrical structural guiding member shown generally as 5, so as to be coaxial therewith. The structural guiding member 5 may take many forms, but as shown here includes a relatively long hollow tube 5a extending the length of shaft section 1 and attached to a short cylindrical guide extension 5b by means of bolts 6. An adjacent cylindrical structural guiding member 7 surrounding the adjacent shaft section 2 extends inside the end of extension 5b with close clearances and is supported thereby in telescopic fashion. An O-ring seal 8 is provided to prevent loss of bearing lubricant.

It will be understood that the right-hand end (not shown) of structural guide 5 would be similar to that of portion 7 pictured, and that the left-hand end (not shown) of structural member 7 would be similar to portions 5a, 5b (see FIG. 3).

A pedestal assembly, shown generally as 9, supports cylindrical member 5b, and hence one end of structural member 5, in such a manner that limited universal movement of bearing 4 can take place. Pedestal assembly 9 will be described later in detail, but it should be noted briefly, that extension member 5b may pivot about a horizontal axis at the location indicated by arrow 10, and that an additional degree of freedom is given to the extension member 5b and bearing 4 by means of a second pivotable connection on one side of the bearing pedestal assembly at the location indicated by arrow 11.

Referring to FIG. 2 of the drawing, an axial view through the pedestal assembly 9, indicates that it includes a right-hand rigid support 12, and a left-hand pivotable support 17. The right-hand support 12 includes a base plate 13, and an attached vertical plate 14, to which is secured a socket housing 15. Socket housing 15 contains a universal socket adapter piece 15a held in place by a retainer 15b and a retaining ring 15c.

Attached to a boss on the side of the cylindrical guide extension 5b is a stub shaft member 16 which extends inside socket housing 15 and carries a male universal adapter piece 16a with spherical surfaces. Thus the guide extension 5b can rotate around a horizointal axis and can also rotate slightly about a vertical axis to the extent that the illustrated clearances permit.

The left-hand side of structural guide extension member 5b is also held in a universal support similar to the one on the right; like members are designated with the same reference numerals. However the socket housing 15, instead of being supported rigidly from the base, is mounted on a pivotable arm 17. Arm 17 is mounted for a limited degree of universal movement about a fixed base 18. This type of mounting for arm 17 adds an additional degree of freedom to the left-hand bearing support 13. Base 18 includes a base plate 18a, spaced walls 18b, 18c carrying a pin 19, and a male universal adapter piece 19a disposed on pin 19. A female socket adapter 17a is disposed in a recess 17b of arm 17. Adapter 17a cooperates with male adapter 19a to provide slight pivotable movement in a transverse direction (limited by clearance with walls 18b, 18c) and substantial pivotable movement about a horizontal axis.

The three universal connections shown allow structural member 5b to become oriented at any position in space to a limited degree and also to move somewhat in translation, i.e. up and down, and back and forth to a limited degree. At the same time, extension member 5b is nevertheless supported by members 12, 17, 18 when considered together with all of the other pedestals 9 spaced along the shafting. In other words pedestal assembly 9 is unstable when considered alone, but it becomes stable when considered together with the rest of the interconnected pedestals. The individual instability or flexibility of each of the pedestal assemblies 9 will, however allow the various structural members comparable to member 5b to adjust along the length of the shafting, each to a limited extent.

The flexible shafting arrangement of the invention is composed of a number of flexible coupling and pedestal arrangements such as the one illustrated in FIGS. 1 and 2. A better understanding of the invention may be had by reference to the simplified schematic single line drawing of FIGS. 3 and 4, wherein the misalignment is greatly exaggerated for purposes of explanation. FIG. 3 is an elevation view and FIG. 4 is a comparable plan view.

The base or deck level for the shafting is illustrated by the line 20, which is drawn as an irregular curve illustrating deflections from a normally level plane. Distortion of line 20 could be brought about by uneven thermal expansion and contraction, or by external forces. The normal level of support is illustrated by dotted line 20'.

A number of pivotable pedestal halves 21–24 (analogous to pedestal half 13 of FIG. 2) and mating rigid pedestal halves 21'–24' (analogous to pedestal half 14 of FIG. 2) are spaced along the supporting structure. The type of movement executed by the pivotable pedestal half is very complicated and is illustrated in the plan and elevation views by lines 29–32 respectively.

Pedestal halves 21–24 and 21'–24' cooperate in pairs to form pedestal assemblies such as 21, 21', etc. which serve to support the left-hand ends 25a–28a. Supported ends 26a, 27a, 28a have cylindrical extending portions (see 5b of FIG. 1) within which are disposed the right-hand free ends 25b, 26b, 27b respectively of adjacent structural guiding members (see 7 of FIG. 1).

Held inside each structural guiding member 25–28 is a bearing, 33–36 respectively, which is coaxial with its respective guiding member (see bearing 4 in FIG. 1). Rotatably journaled in bearings 33–36 are the left-hand ends of short shaft sections 37–40 respectively. Each shaft section is connected to the adjacent shaft section by means of a flexible connection indicated as 41–44.

The operation of the invention may be described as follows. Primary orientation of the shafting is determined by the interaction of the structural guiding members 25–28. Movement of any one of these structural guiding members influences its immediate neighbors. For example, if the right-hand guiding member 28 of FIG. 3 is moved upward the closely fitting connection of members 27b, 28a imposes a couple on guiding member 27 which in turn imposes a couple on guiding member 26, etc. The pivotable arms 29–32 between structural guiding members 25–28 and pedestal halves 21–24 and the three universal connections in each pedestal set allow this adjustment to take place to the extent permitted by the universal connections in the pedestals illustrated in FIG. 2. Therefore local misalignment of a pedestal assembly is communicated to the structural member supported thereby. This structural member influences adjacent structural members which are allowed to rotate and translate due to the universal and pivotable connections between them and their pedestals. Local misalignment between pedestals is therefore distributed between structural members. Since the structural members support the shaft bearings, this distribution also takes place in the shaft couplings and reduces spline tooth misalignment.

In addition to the fact that misalignment is distributed among the flexible couplings, the improved shafting arrangement shown offers additional advantages in that only one bearing, one pedestal assembly, and one set of spline connections is required for each shaft section. It is of course understood that the final shaft sections on either end would require an additional bearing to provide stability. On the other hand, the orientation of the bearing at each support is not determined entirely locally but is affected by the orientations of the other bearings up and down the line. The degree to which the interconnected group of structural members 25–28 will distort is, of course, dependent both upon the clearances at the telescoped interconnections and also upon the inherent flexibility along the length of the structural guiding members. Such factors can be readily selected to provide an over-all deflection of the interconnected structural members to a degree which will provide for expected local deflections of the base.

It is understood that various modifications could be made in the preferred embodiment shown in FIGS. 1 and 2. Naturally the splined interconnections between shafts and the telescoped interconnections between structural guiding members could be reversed with no effect on the operation of the structure.

While there is described herein what is, at present, considered to be the preferred embodiment of the invention, other modifications will become apparent to those skilled in the art and it is desired to cover in the appended claims all such modifications as fall within the true spirit and scope of the invention.

What we claim as new and desire to secure by Letters Patent of the United States is:

1. Flexible torque transmission shafting comprising:
    a plurality of longitudinally spaced support pedestal assemblies,
    a plurality of structural guiding members disposed end-to-end, each having a first end supported by one of said pedestal assemblies to provide limited universal movement and limited translation and a second end supported by the first end of an adjacent guiding member,
    a plurality of bearings each disposed within one of said guiding members near the pedestal assembly, and
    a plurality of shaft sections disposed end-to-end and interconnected by flexible couplings for torque transmission, each of said shaft sections having one end supported and rotatably journaled by one of said bearings and the other end supported by an adjacent shaft section at the flexible coupling.

2. In combination:
    a plurality of longitudinally spaced support pedestal assemblies,
    a plurality of cylindrical guides disposed end-to-end and each having a first end supported by one of said pedestal assemblies to provide limited universal movement and limited translation and a second end supported in telescopic fashion by the first end of an adjacent cylindrical guide,
    a plurality of bearing means each disposed near the first end of one of said guides, and
    a plurality of shaft sections disposed end-to-end and interconnected by flexible couplings for torque transmission, each of said shaft sections being disposed within one of said cylindrical guides and supported at one end thereof by said bearing means and at the other end thereof by the adjacent shaft section at the flexible coupling, whereby local misalignment between pedestal assemblies is distributed between said guides which in turn reduce misalignment between said shaft section flexible couplings.

3. Flexible torque-transmission shafting, comprising:
a plurality of longitudinally spaced generally aligned pedestal assemblies each including two transversely spaced pedestal halves disposed on a supporting base subject to local deflection and each said pedestal assembly including at least three universal joints,
a plurality of cylindrical guides disposed end-to-end each having a first end supported by one of said pedestal pairs so as to provide both a limited degree of universal movement and a limited amount of translatory movement and a second end held in telescoping relationship with a first end of an adjacent cylindrical guide, whereby transverse or universal movement of each guide imposes a transverse force or couple on adjacent guides,
a plurality of bearings, each disposed within the first end of one of said guides and coaxial therewith, and
a plurality of shaft sections disposed end-to-end and interconnected by torque-transmitting spline tooth connections, each of said shaft sections being disposed within one of said guides and rotatably journaled at one end by one of said bearings and supported at the other end by one of said spline connections, whereby local misalignment of said pedestal halves is communicated to several guides which in turn distribute said misalignment between the spline teeth of several shaft sections.

4. Flexible torque-transmission shafting, comprising:
a plurality of longitudinally spaced pedestal assemblies disposed on a supporting base subject to local deflection, each of said pedestal assemblies including a first rigid pedestal half and a second transversely spaced pivotable pedestal half and being unstable without additional support,
a plurality of cylindrical guides disposed end-to-end each having a first end supported between said pedestal halves with universal connections, whereby said pedestal assembly will provide both a limited degree of universal movement and a limited amount of translatory movement, and a second end supported in telescoping relationship by a first end of an adjacent cylindrical guide,
a plurality of bearings, each disposed within the first end of one of said guides and coaxial therewith, and
a plurality of shaft sections disposed end-to-end and interconnected by torque-transmitting flexible couplings, each of said couplings comprising external spline teeth on a first end of the shaft section journaled in said bearing and internal spline teeth on a second end of an adjacent shaft section meshing with and supported by said external spline teeth, whereby local misalignment between said pedestals is distributed among said guides causing reduced local misalignment in said meshed spline teeth.

References Cited in the file of this patent
UNITED STATES PATENTS

| | | |
|---|---|---|
| 1,862,099 | Sheldrick | June 7, 1932 |
| 2,030,511 | Gruber | Feb. 11, 1936 |
| 2,682,434 | Guy | June 29, 1954 |
| 2,834,640 | Muller et al. | May 13, 1958 |
| 3,016,273 | Benoit | Jan. 9, 1962 |